(12) United States Patent
Grollitsch

(10) Patent No.: US 6,799,935 B1
(45) Date of Patent: Oct. 5, 2004

(54) LIFTING APPARATUS FOR USER IN THE BED OF A PICKUP TRUCK

(76) Inventor: Helmut Grollitsch, 1923 Hoskins Dr., Houston, TX (US) 77080

( * ) Notice: Subject to any disclaimer, the term of this patent is extended or adjusted under 35 U.S.C. 154(b) by 169 days.

(21) Appl. No.: 10/145,852

(22) Filed: May 14, 2002

(51) Int. Cl.$^7$ .................................................. B60P 1/00
(52) U.S. Cl. ....................... 414/546; 414/467; 414/468; 414/469
(58) Field of Search ................................ 414/546, 767, 414/468, 469, 486, 537, 555

(56) References Cited

U.S. PATENT DOCUMENTS

| 3,637,097 A |   | 1/1972 | Horowitz |
|---|---|---|---|
| 3,700,123 A |   | 10/1972 | Corely, Jr. |
| 4,265,585 A |   | 5/1981 | Hawkins |
| 4,383,791 A | * | 5/1983 | King ........................... 414/542 |
| 4,613,274 A | * | 9/1986 | Stapleton .................... 414/473 |
| 4,787,809 A |   | 11/1988 | Zrostlik |
| 5,119,961 A |   | 6/1992 | Runn |
| 5,641,262 A |   | 6/1997 | Dunlop et al. |
| 6,019,567 A |   | 2/2000 | Lutkas et al. |
| 6,234,741 B1 |   | 5/2001 | McDaniel |
| 6,435,806 B1 | * | 8/2002 | Rinderknecht .............. 414/546 |
| 6,622,455 B2 | * | 9/2003 | Davis et al. .................. 53/399 |

* cited by examiner

Primary Examiner—Eileen D. Lillis
Assistant Examiner—Michael Lowe
(74) Attorney, Agent, or Firm—Harrison & Egbert

(57) ABSTRACT

A lifting apparatus for use in the bed of a pickup truck having a lifting bar of a generally U-shaped configuration with one side pivotally connected to a side wall of the bed of the pickup truck and an opposite side pivotally connected to another side wall of the bed of the pickup truck. A cylinder has a piston rod extending outwardly therefrom. This piston rod has an end pivotally connected to a linkage connected to the lifting bar. The cylinder is actuatable so as to move the piston rod between a retracted position and an extended position such that the lifting bar is pivotable relative to the movement of the piston rod. The linkage has a scissor-like configuration which allows the lifting bar to be stowed completely within the interior of the bed of the pickup truck.

16 Claims, 3 Drawing Sheets

LIFTING APPARATUS FOR USER IN THE BED OF A PICKUP TRUCK

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to lifting devices as used in pickup trucks. More particularly, the present invention relates to apparatus whereby heavy loads can be moved from a location outside of the bed of a pickup truck into the interior of the pickup truck bed and, in particular, in a desired location within the bed of the pickup truck.

BACKGROUND OF THE INVENTION

For many years, the advantages of providing a cargo carrying vehicle such as a truck with a lift gate have been recognized. As is well known, lift gates are gates which not only close the rear of the bed of the vehicle, but which, when in the housing position, may be moved between a first position wherein they are an extension of the truck bed and a second position resting on the underlying terrain. Cargo may be loaded on or removed from the gate while in the latter position or loaded into or unloaded from the vehicle when in the former position. Conventionally, some sort of motor is utilized to drive the lift gate between the two positions. There is some sort of linkage which maintains the upper surface of the gate in a generally horizontal plane during such movement to prevent cargo on the gate from falling off.

Lift gates are generally not suited for small or medium sized cargo-carrying vehicles because the linkage and the drive system for moving the gate between upper and lowered positions was adapted to be located wholly below the plane of the truck bed. This, in turn, requires that the bed of the truck be located relatively high above the underlying terrain to provide the requisite ground clearance. As a result, this is limited to relatively large cargo-carrying vehicles with high road clearances.

Another problem with lift gates is that the cargo is only brought to the very end of the bed of the truck. As a result, it is still necessary to move the heavy load from the lift gate into the bed of the truck. Such movement of heavy loads can be inconvenient and difficult to accomplish. In other circumstances, the heavy load must be lifted a small distance so as to bring the load into proximity onto the lift gate. Once again, workers must be prepared to lift the load, at least a small distance, so as to place the load in its desired position on the lift gate. In many circumstances, the heavy load is only delivered to the very back of the bed of the pickup truck. As a result, the pickup truck will have an unbalanced load heavily oriented toward the rear of the truck. Such unbalanced loads can create driving hazards. Additionally, and furthermore, the lift gates only allow the load to be delivered toward the rear of the bed of the pickup truck. When additional heavy loads must be introduced into the bed, there is often a lack of space for such loads since the initial loads have not been moved toward the forward end of the bed.

In other circumstances, cranes have been proposed for use on such pickup truck beds. Unfortunately, these cranes are often unwieldy devices which prevent the load from being adequately delivered into the interior of the vehicle. In certain circumstances, the cranes will present a structure which extends outwardly above the top of the truck body. As a result, damage can often occur during the movement of the truck with these outwardly extending projections. Additionally, and furthermore, these cranes also fail to deliver the load where it is best desired, i.e. toward the forward end of the bed. These rear-mounted cranes often lift the load to a position whereby the worker can push the load into the rear portion of the pickup truck bed. Once again, limited loads and unevenly distributed loads will result.

In the past, various patents have issued in the past for the loading of the bed of pickup trucks. U.S. Pat. No. 3,637,097, issued on Jan. 25, 1972 to R. R. Horowitz, describes a power-operated tailgate. This power-operated tailgate mechanism has pairs of bell-crank lever arms pivotally mounted on the bed surface and outer ends pivotally connected to a support arm which is attached to the tailgate. The relationship of the pivotal connections is such as to provide a parallelogram linkage for the purpose of maintaining the tailgate surface in a load-carrying attitude during the elevating and lowering movement of the tailgate.

U.S. Pat. No. 3,700,123, issued on Oct. 24, 1972 to Q. D. Corley, Jr., describes a lift frame for attachment to the truck bed. This lift frame includes a tubular horizontal base having integral transverse brackets for attachment to the truck frame and having upright end posts securely welded to the tubular member. A hinged lift platform is provided which is swingably supported by parallelogram arms on the frame end posts. A torque bar connects the lift arms. A hydraulic power cylinder connects one lift arm and one corner post to swing the lift platform between the upper position in the plane of the truck bed and a lower ground position.

U.S. Pat. No. 4,265,585, issued on May 5, 1981 to W. H. Hawkins, teaches a loading device for vehicle beds wherein a transversely aligned boom members have an extensible inverted U-shaped member adjustably carried on free ends thereof. The U-shaped member is pivotally secured on a supporting frame and operated by fluid-operated cylinder assemblies which are pivotally connected on one end to a respective boom and on the other end to an upright frame member carried forwardly in the vehicle. The cylinder assemblies ascend above the top of the bed of the pickup truck so that the U-shaped member will rest in a stowed position above the truck bed.

U.S. Pat. No. 5,119,961, issued on Jun. 9, 1992 to L. E. Runn, describes a removable, truck-mounted crane with both an inclined boom for high lift and a horizontal telescoping boom for extended reach beyond the truck. The crane has two winches which can be routed to either boom. A rolling storage stand with winches is used to support the truck tailgate while enabling one person to install or remove the crane from the truck.

U.S. Pat. No. 5,641,262, issued on Jun. 24, 1997 to Dunlop et al., describes a hydraulic lift apparatus whereby the tailgate of the pickup truck can be moved from a lowered position to an upper position.

U.S. Pat. No. 6,019,567, issued on Feb. 1, 2000 to Lutkas et al. describes a slidable load lifting system which can be retracted into the pickup truck. This load lifting apparatus includes a base frame member attached to the truck bed. This base frame member supports a substantially planar roller platform member slidably therein. A pair of elongate rail members extends in parallel and is adapted to engage a set of roller wheels provided on the bottom of the roller platform member. A substantially planar lift platform member is operatively connected to the other roller platform member through a set of parallelogram linkages which allow the lift platform to be moved between a raised position coplanar with the roller platform and a lowered position out of the plane of the roller member for convenient loading of the lift platform at ground level.

U.S. Pat. No. 6,234,741, issued on May 22, 2001 to S. P. McDaniel, describes a forklift for pickup truck. This forklift device is adapted to be installed within the bed of a conventional pickup truck. The horizontal movement of the fork is provided by movement of the truck. When the device is not in use, it is disposed above the forward portion of the truck bed.

It is an object of the present invention to provide a lifting apparatus for use in a pickup truck which allows loads to be delivered into the bed of the pickup truck.

It is another object of the present invention to provide a lifting apparatus which allows heavy loads to be placed in any desired position within the bed of the pickup truck.

It is another object of the present invention to provide a lifting apparatus which avoids the use of power-operated tailgates.

It is another object of the present invention to provide a lifting apparatus which can be stowed entirely within the interior of the bed of the pickup truck.

It is still a further object of the present invention to provide a lifting apparatus which entirely avoids the need for human lifting activity.

It is still another object of the present invention to provide a lifting apparatus which provides an entire 180° range of motion of the lifting arm relative to its pivot point within the bed of the pickup truck.

It is still another object of the present invention to provide a lifting apparatus which is easy to use, relatively inexpensive, easy to install and simple to manufacture.

These and other objects and advantages of the present invention will become apparent from a reading of the attached specification and appended claims.

BRIEF SUMMARY OF THE INVENTION

The present invention is a lifting apparatus comprising a pickup truck having a bed with a pair of side walls on opposite sides of the bed, a lifting apparatus having a generally U-shaped configuration with one side pivotally connected to one of the side walls and an opposite side pivotally connected to another of the side walls and a cylinder means connected to at least one of the sides of the lifting bar. The cylinder means serves to pivot the lifting bar between a first position extending outwardly between the end opening of the pickup truck bed and a second position stowed entirely within the bed of the pickup truck such that the lifting bar has an end adjacent the forward wall of the pickup truck bed. A linkage connects the cylinder means to the side of the lifting bar generally adjacent to the pivotal connection of the lifting bar to the side of the bed.

The linkage of the present invention includes a first arm having a first end pivotally connected to the side of the lifting bar and a second end pivotally connected to the cylinder means. The linkage also has a second arm having a first end pivotally connected to the cylinder means and a second end pivotally connected to the side wall of the pickup truck bed. The second end of the first arm is pivotable relative to the second arm.

In the present invention, the cylinder means comprises a cylinder pivotally connected at one end of the side wall of the bed and a piston rod translatable relative to the cylinder. The second end of the first arm and the first end of the second arm are connected to an end of the piston rod opposite the cylinder. The first end of the first arm has a pivot point positioned outwardly of one surface of the side of the lifting bar. This pivot point is positioned away from the pivotal connection of the lifting bar with the side wall. The second end of the second arm has a pivot point with the side wall positioned on a side of the pivotal connection of the lifting bar with the side wall opposite to the pivot point of the first arm with the lifting bar. The pivot point of the second end of the second arm is positioned lower in the bed than the pivotal connection of the lifting bar with the side wall.

In the present invention, the lifting bar has a first side pivotally connected to one of the pair of side walls of the bed. The lifting bar has a second side pivotally connected to another of the pair of side walls. The lifting bar has a crossbar extending between the first and second sides at an end opposite the pivotal connections of the lifting bar with the pair of side walls. A lifting line can extend downwardly from the crossbar so as to connect to a load to be lifted.

In the present invention, the cylinder means comprises a first cylinder pivotally connected to one of the pair of side walls, a first piston rod translatable in and extending from the first cylinder and having an end opposite the first cylinder interconnected to the first side of the lifting bar, a second cylinder pivotally connected to another of the pair of side walls, and a second piston rod translatable in and extending from the second cylinder so as to have an end opposite the second cylinder interconnected with the second side of the lifting bar.

The end of the pickup truck has a first wheel well and a second wheel well. The first cylinder is positioned above the first wheel well. The second cylinder is positioned above the second wheel well. The pickup truck has a tailgate pivotally affixed so as to open and close the end opening of the truck. The lifting arm and/or the tailgate has a switch means affixed thereto for stopping a movement of the lifting bar when the lifting bar approaches the top of the tailgate. A control means is connected to the cylinder means. This control means serves to actuate the cylinder means from moving the lifting bar between its first and second positions.

In the preferred embodiment of the present invention, the cylinder means is a hydraulic cylinder.

DETAILED DESCRIPTION OF THE INVENTION

Figure 1:
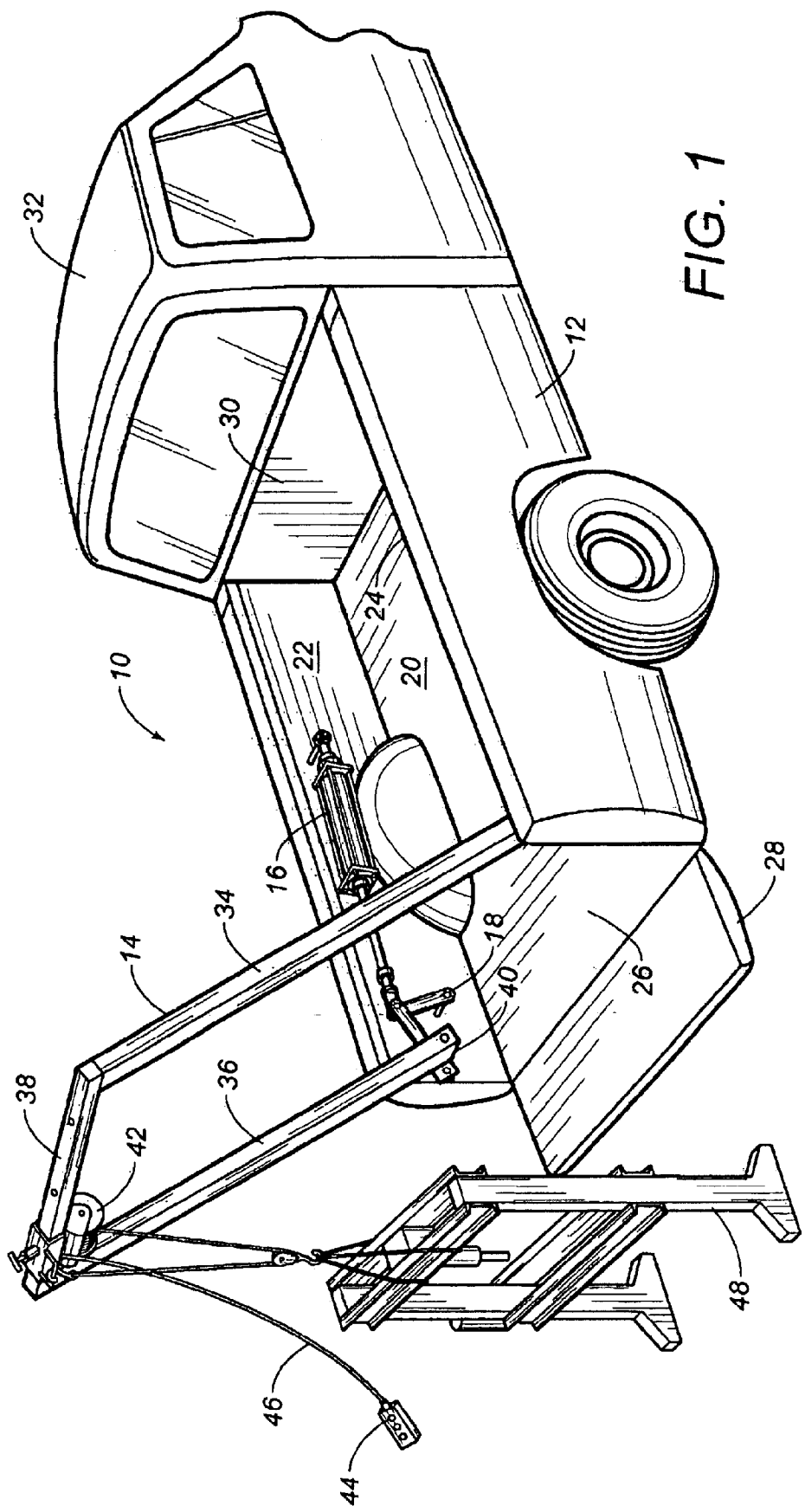
FIG. 1 is a perspective view showing the pickup truck with the lifting load in a position for lifting a load.

Referring to FIG. 1, there is shown the lifting apparatus 10 in accordance with the teachings of the preferred embodiment of the present invention. The lifting apparatus 10 includes a pickup truck 12, a lifting bar 14 and a cylinder assembly 16. Cylinder assembly 16 is connected to the lifting bar 14 through linkage 18.

In the present invention, the pickup truck 12 has a bed 20 with a first side wall 22 and a second side wall 24. The bed 20 also has an end opening 26 with a tailgate 28 pivotally attached thereto. The tailgate 28 is pivotable so as to open and close the end opening 26. In one position, the tailgate 28 will be in planar relationship with the bed 20. In the closed position, the tailgate 28 will be upright so as to be transverse to the bed 20. The pickup truck 12 also has a forward wall 30 at an end of the bed 20 opposite the end opening 26. The pickup truck 12, as in the nature of all pickup trucks, has a passenger compartment 32 forward of the wall 30.

As can be seen in FIG. 1, the lifting arm 14 has a first side and a second side 36 in parallel relationship to the first side. A crossbar 38 extends between the ends of the sides. The lifting arm 14 has a generally inverted U-shaped configuration. The ends of the sides 34 and 36 opposite the crossbar 38 are pivotally connected at 40 to the side walls of the pickup truck 12. Suitable structures can be employed so as to allow the pivotal movement 40 to occur without damage to the side walls 22 and 24. A lifting line 42 is affixed to the crossbar 38 generally between the sides. The lifting line 42 is connected to a load 48 such that the load 48 can move upwardly and inwardly relative to the 180° range of motion of the lifting arm 14.

With reference to FIG. 1, when it is desired to place the lifting bar 14 in a position for lifting the load 48, a controller (in the passenger compartment 32 or on a side wall of the bed 20) can be actuated so that the cylinder assembly 16 will cause the lifting bar 14 to be moved outwardly of the end opening 26 of the bed 20. When the crossbar 38 is approximately above the load 48, the lifting line 42 can be connected to the load 48. The cylinder assembly 16 can be actuated so that the lifting bar 14 is pivoted about pivot point 40 so as to move the load 48 from the position shown in FIG. 1 to a position within the bed 20. When the crossbar 38 is in a proper position above the bed 20, the lifting line 42 can be released so that the load 48 is in its desired position in the bed 20.

It is important to note that, in the present invention, it is not necessary to use a winch. Strong support lines 42 can extend downwardly from the crossbar 38. The pivotal movement of the lifting arm 14 will allow the load 48 to be moved to a desired position within the bed 20. The load 48 can then be released from the lines so as to be placed in a desired position within the bed 20. The configuration of the present invention allows the load 48 to be placed in any desired location within the bed 20. As such, if multiple loads 48 must be placed within the bed 20, they can be first moved toward the forward wall 30 and then placed in position sequentially thereafter toward the end opening 26. After the load has been placed within the bed 20, the tailgate 26 can be raised upright so that the pickup truck 12 can move to a desired location.

Figure 2:
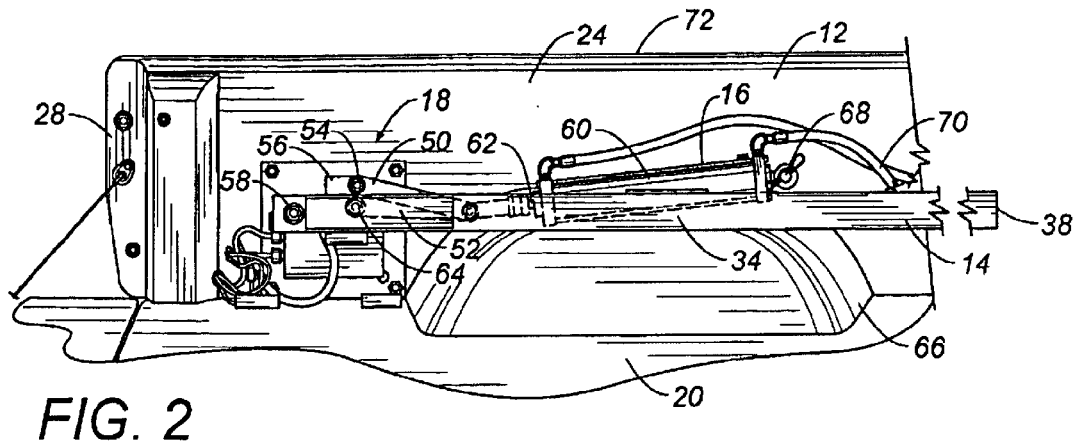
FIG. 2 is a side view showing the lifting arm in a retracted position within the bed of the pickup truck.

Iportantly, in the present invention, the linkage 18 is a unique construction which allows for the full 180° range of motion of the lifting arm 14. FIG. 2 shows the lifting arm 14 in its stowed position within the bed 20 of the pickup truck 12. In FIG. 2, it can be seen that the linkage 18 includes a first arm 50 and a second arm 52. The first arm 50 has a pivot point 54 connected to a gusset 56 extending outwardly from a surface of the side 34 of the lifting arm 14. The crossbar 38 has a pivotal connection with the side wall 24 at pivot point 58. It can be seen that the gusset 56, along with pivot point 54, is positioned outwardly from and above the pivot point 58 (towards the crossbar 38).

The cylinder assembly 16 includes a cylinder 60 having a piston rod 62 translatable in and extending from the cylinder 60. The first arm 50 has a first end pivotally connected to the piston rod 62. The opposite end of the first arm 50 is pivotally connected to the gusset 56 at pivot point 54. The second arm 52 has a first end pivotally connected to the piston rod 62 and a second end pivotally connected at pivot point 64 to the side wall 24 of the pickup truck 12.

As can be seen in FIG. 2, the cylinder 62 is resting generally flat above the top surface of the wheel well 66 of the pickup truck 12. Cylinder 60 has a pivotal connection 68 with the side wall 24. As such, during the movement of the lifting bar 14, the cylinder assembly 16 will suitably pivot about pivot point 68. A conduit 70 is connected to the cylinder 60 so as to deliver fluid, either hydraulic or pneumatic, into the cylinder 60 for the movement of the piston rod 62.

In FIG. 2, tailgate 28 is shown in its raised position.

Figure 3:
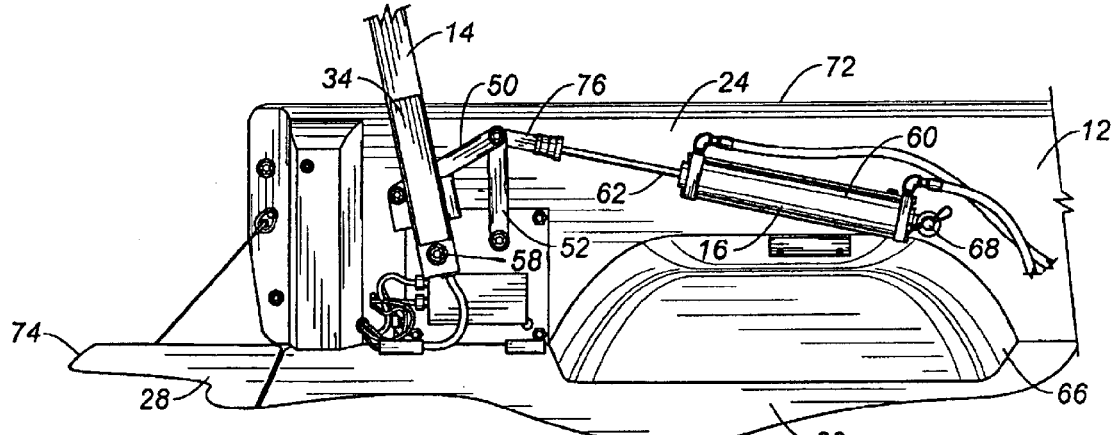
FIG. 3 is a side view showing the lifting arm in an upright position.

FIG. 3 shows the lifting bar 14 in an upright position above the top 72 of the truck body 12. In the upright position shown in FIG. 3, the lifting bar 14 is moving the load 48 from either the interior of the bed 20 outwardly therefrom or has lifted a load and is moving the load into the bed 20. The tailgate 28 is illustrated in its horizontal planar configuration. A switch 74 is positioned on the upper end of the tailgate 28. Switch 74 could also be placed on the lifting bar 14. Switch 74 causes a stopping of the movement of the lifting bar when the lifting bar 14 comes into proximity with the top of the tailgate 28., As a result, damage to an inadvertently raised tailgate 28 is prevented.

In FIG. 3, it can be seen that the side 34 has its pivot point 58 supported on the side wall 24 of the truck body 12. The first arm 50 and the second arm 52 have a scissor-like structure joined to a supporting end 76 of the piston rod 62 of cylinder assembly 16. The cylinder 60 of cylinder assembly 16 is pivotally connected at 68 to the side wall 24. So as to accommodate a full range of motion, the cylinder assembly 16 will slightly angularly deflect upwardly from its flat position upon the top of wheel well 66.

Figure 4:
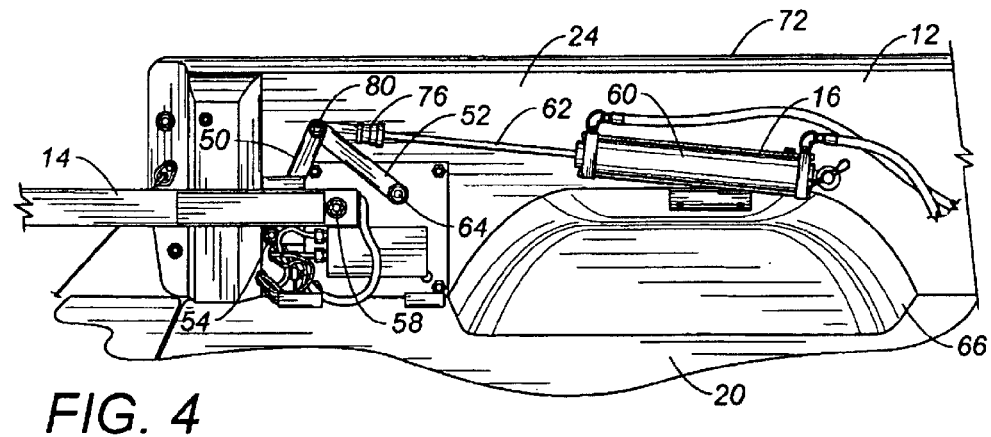
FIG. 4 is a side view showing the lifting arm in its outwardly extended position.

FIG. 4 shows the lifting bar 14 in its outermost extended position. In this orientation, the lifting bar 14 is pivoted completely about its pivot point 58 with the side wall 24 of the truck body 12. The cylinder assembly 16 is slightly deflected upwardly from the top of wheel well 66. The first arm 50 is pivoted relative to the second arm 52 and also pivoted about its pivot point 54 relative to the lifting bar 14. In FIG. 4, when the lifting bar 14 is in its outermost extended position, the pivot point 64 of the second arm 52 is shown as positioned below the pivot point 58 of the lifting bar 14. Each of the arms 50 and 52 has a pivot point 80 joined with the support structure 76 at the end of piston rod 62 opposite cylinder 60. It is through this unique linkage mechanism that the full range of motion of the lifting arm 14 is accomplished.

Figure 6:
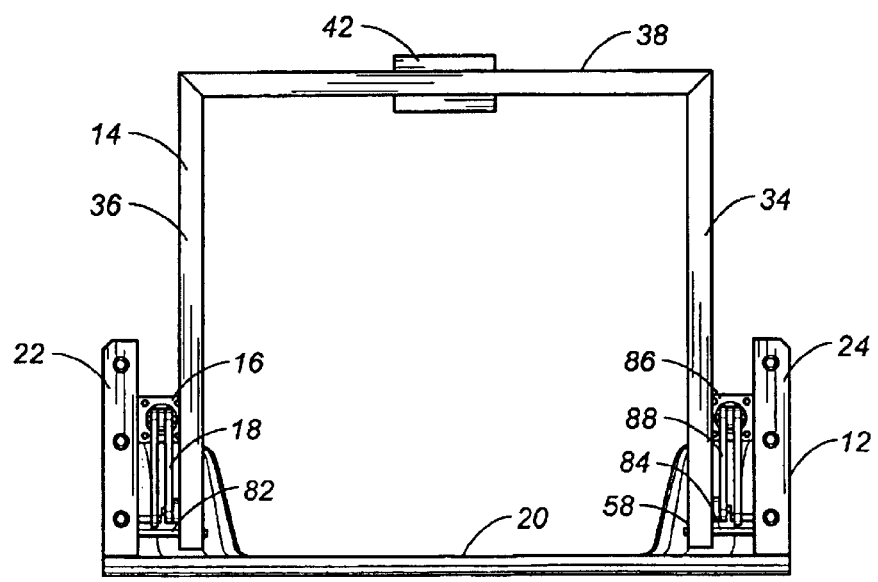
FIG. 6 is an end view from the rear opening of the bed of the pickup truck showing the lifting arm in an upright position.

FIG. 6 shows an end view of the truck body 12. In FIG. 6, the lifting bar 14 is shown in an upright position. An axle 82 is shown as the pivot point between side 36 of lifting bar 14 and the side wall 22 of truck bed 20. Similarly, another axle 84 is illustrated as the pivotal connection 58 between the side 34 of lifting bar 14 and the side wall 24. A first cylinder assembly 16 is shown as positioned between the side 36 of lifting bar 14 and the inner surface of side wall 22. Similarly, a second cylinder assembly 86 is shown as positioned adjacent to the side wall 24. In the present invention, it is believed that a pair of cylinder assemblies 16 and 86 are necessary for the full and complete functioning of the lifting bar 14 in the preferred manner. However, it is possible that a single cylinder assembly can be used for the proper functioning of the lifting bar 14. If two cylinder assemblies are used, then the lifting motion will be smoother and larger loads can be supported. Each of the cylinder assemblies 16 and 86 will include suitable linkage 18 and 88 respectively joining to the lifting bar 14.

Figure 5:
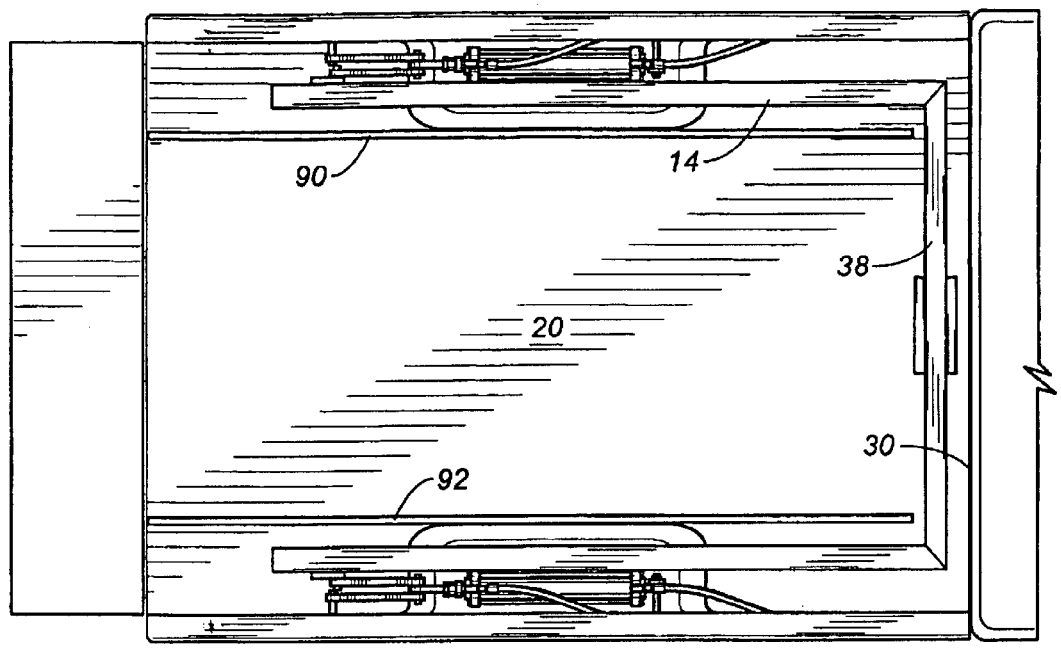
FIG. 5 is a plan view showing the lifting arm as stowed in the bed of the pickup truck.

FIG. 5 shows the bed 20 as having the lifting bar 14 in a properly stowed position. In this stowed position, the lifting bar 14 has its crossbar 38 adjacent to the forward wall 30 of the bed 20. It can be seen in FIG. 5 that the lifting bar 14 is completely stowed within the bed 20. Protective panels 90 and 92 can extend upwardly vertically from the bed 20 on the interior of the lifting bar 14. Protective panels 90 and 92 will prevent any unsafe human interaction with the actuating mechanisms associated with the lifting bar 14.

Within the concept of the present invention, it is possible that the mechanisms can substitute for the use of the cylinder assemblies. For example, drive gear mechanisms with associated chains could possibly be used so as to move the lifting bar to desire mechanisms. Alternatively, cylinder assemblies can be used in association with chains so as to pull a chain so as to drive the gear associated with lifting bar at its pivot point. In particular, a double-acting cylinder can be used so as to achieve the desired range of motion of the lifting arm. Additionally, and furthermore, worm gears can be associated with the lifting bar 14 so as to drive the bar to its desired location. However, it is believed that these mechanisms are extremely expensive and do not work in as efficient a manner as the cylinder assemblies associated with the present invention and as associated with the linkage of the present invention.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A lifting apparatus comprising:
   a pickup truck having a bed with a pair of side walls on opposite sides of said bed, said bed having an opening at one end and a forward wall opposite said opening;
   a lifting bar having a generally U-shaped configuration with one side pivotally connected to one of said pair of side walls and an opposite side pivotally connected to another of said pair of side walls;
   a cylinder means connected to at least one of the sides of said lifting bar, said cylinder means for pivoting said lifting bar between a first position extending outwardly of said opening of said bed and a second position stowed within said bed such that said lifting bar has an end adjacent said forward wall of said bed; and
   a linkage connecting said cylinder means to the side of said lifting bar generally adjacent the pivotal connection of said lifting bar to the side wall of said bed, said linkage comprising:
   a first arm having a first end pivotally attached to the side of said lifting bar, said first arm having a second end pivotally connected to said cylinder means; and
   a second arm having a first end pivotally connected to said cylinder means and a second end pivotally connected to the side wall of the bed.

2. The apparatus of claim 1, said second end of said first arm being pivotable relative to said first end of said second arm.

3. The apparatus of claim 1, said cylinder means comprising:
   a cylinder pivotally connected at one end to the side wall of said bed; and
   a piston rod translatable relative to said cylinder, said second end of said first arm and said first end of said second arm being connected to an end of said piston rod opposite an end of said cylinder.

4. The apparatus of claim 1, said first end of said first arm having a pivot point positioned outwardly of one surface of the side of the said lifting bar, said pivot point positioned away from the pivotal connection of said lifting bar with the side wall.

5. The apparatus of claim 4, said second end of said second arm having a pivot point with side walls positioned on a side of the pivotal connection of said lifting bar with the side wall opposite said pivot point of said first arm with said lifting bar.

6. The lifting apparatus of claim 5, said pivot point of said second end of said second arm positioned lower than the pivotal connection of said lifting bar with the side wall.

7. The apparatus of claim 1, said lifting bar having a first side pivotally connected to one of said pair of side walls of said bed, said lifting bar having a second side pivotally connected to another of said pair of side walls, said lifting bar having a crossbar extending between said first and second sides at an end opposite the respective pivotal connections of said lifting bar with said pair of side walls.

8. The apparatus of claim 7, said cylinder means comprising:
   a first cylinder pivotally connected to one of said pair of side walls;
   a first piston rod translatable in and extending from said first cylinder, said first piston rod having an end opposite said first cylinder interconnected to said first side of said lifting bar;
   a second cylinder pivotally connected to another of said pair of side walls; and
   a second piston rod translatable in and extending from said second cylinder, said second piston rod having an end opposite said second cylinder interconnected to said second side of said lifting bar.

9. The apparatus of claim 8, said bed having a first wheel well and a second wheel well, said first cylinder positioned above said first wheel well, said second cylinder positioned above said second wheel well.

10. The apparatus of claim 1, said pickup truck having a tailgate pivotally affixed thereto so as to open and close said opening, said tailgate having a switch means interactive therewith for stopping a movement of said lifting bar when second cleaning tool 34 lifting bar approaches said tailgate.

11. The apparatus of claim 1, further comprising:
   a control means connected to said cylinder means, said control means for manually actuating said cylinder means for moving said lifting bar between said first and second positions.

12. The apparatus of claim 11, said cylinder means comprising a hydraulic cylinder.

13. A lifting apparatus for use in the bed of a pickup truck comprising:

a lifting bar having a first side and a second side in parallel relationship to said first side, said lifting bar having a crossbar extending between said first and second sides at one end thereof;

a linkage pivotally connected to at least one of said first and second sides adjacent an end opposite said crossbar, said linkage comprising:
 a first arm having a first end attached to one side of said lifting bar, said first arm having a second end pivotally connected to said piston rod; and
 a second arm having a first end pivotally connected to said piston rod and a second end suitable for pivotal connection to a side wall of the bed of the pickup truck; and a cylinder having a piston rod extending outwardly therefrom, said piston rod having an end pivotally connected to said linkage, said cylinder being actuatable so as to move said piston rod between a retracted position and an extended position, said lifting bar being pivotable relative to the movement of said piston rod between said retracted position and said extended position.

14. The lifting apparatus of claim 13, said first end of said first arm having a pivot point positioned outwardly of a surface of the side of said lifting bar, said pivot point of said first end of said first arm positioned away from a pivotal connection of the lifting bar with the side wall of the bed of the pickup truck.

15. The lifting apparatus of claim 14, said second end of said second arm having a pivot suitable for connection with the side walls of the bed of the pickup truck, said pivot point of said second end of said second arm positioned on a side of the pivotal connection of the lifting bar opposite the side wall of the bed of the pickup truck opposite the pivot point of said first arm with said lifting bar.

16. The lifting apparatus of claim 13, further comprising:
 a control means connected to said cylinder, said control means for actuating said cylinder for moving bar between a deployed position and a stowed position.

* * * * *